US010664573B2

(12) United States Patent
Yao et al.

(10) Patent No.: US 10,664,573 B2
(45) Date of Patent: May 26, 2020

(54) COMPUTING APPARATUS AND METHOD WITH PERSISTENT MEMORY

(71) Applicant: Intel Corporation, Santa Clara, CA (US)

(72) Inventors: Jiewen Yao, Shanghai (CN); Vincent J. Zimmer, Federal Way, WA (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/572,767

(22) PCT Filed: Jun. 17, 2015

(86) PCT No.: PCT/CN2015/081610
§ 371 (c)(1),
(2) Date: Nov. 8, 2017

(87) PCT Pub. No.: WO2016/201628
PCT Pub. Date: Dec. 22, 2016

(65) Prior Publication Data

US 2018/0144105 A1 May 24, 2018

(51) Int. Cl.
*G06F 21/70* (2013.01)
*G06F 21/10* (2013.01)
(Continued)

(52) U.S. Cl.
CPC ............... *G06F 21/10* (2013.01); *G06F 1/14* (2013.01); *G06F 21/57* (2013.01); *G06F 21/572* (2013.01); *G06F 21/70* (2013.01); *G06F 21/725* (2013.01)

(58) Field of Classification Search
CPC .................................................. G06F 21/70
See application file for complete search history.

(56) References Cited

U.S. PATENT DOCUMENTS

| 2004/0153644 | A1* | 8/2004 | McCorkendale | ....... G06F 21/33 |
| | | | | 713/156 |
| 2005/0044203 | A1* | 2/2005 | Kokubun | ................ G06F 21/88 |
| | | | | 709/223 |

(Continued)

FOREIGN PATENT DOCUMENTS

| CN | 1801167 A | 7/2006 |
| WO | WO2011028270 A1 | 3/2011 |
| WO | WO2014035908 A1 | 3/2014 |

OTHER PUBLICATIONS

Extended European Search Report dated Nov. 13, 2018 for European Patent Application No. 15895201.0, 7 pages.

(Continued)

*Primary Examiner* — Thaddeus J Plecha
(74) *Attorney, Agent, or Firm* — Schwabe, Williamson & Wyatt, P.C.

(57) ABSTRACT

Apparatuses, methods and storage media associated with managing a computing platform in view of an expiration date are described herein. In embodiments, an apparatus may include a computing platform that includes one or more processors to execute applications; and a trusted execution environment that includes a tamper-proof storage to store an expiration date of the computing platform, and a firmware module to be operated in a secure system management mode to regulate operation of the computing platform in view of at least whether a current date is earlier than the expiration date. Other embodiments may be described or claimed.

20 Claims, 6 Drawing Sheets

(51) Int. Cl.
    *G06F 21/57*    (2013.01)
    *G06F 1/14*     (2006.01)
    *G06F 21/72*    (2013.01)

(56) References Cited

U.S. PATENT DOCUMENTS

| | | |
|---|---|---|
| 2007/0079112 A1 | 4/2007 | Lewis et al. |
| 2008/0077785 A1* | 3/2008 | Waltermann ............ G06F 21/10 |
| | | 713/2 |
| 2011/0060778 A1* | 3/2011 | Dallari ................. G06F 16/907 |
| | | 707/829 |
| 2014/0091831 A1 | 4/2014 | Nassib et al. |
| 2014/0304520 A1* | 10/2014 | Bobzin ................ G06F 21/572 |
| | | 713/187 |
| 2015/0052610 A1* | 2/2015 | Thom ................... H04L 63/145 |
| | | 726/24 |

OTHER PUBLICATIONS

International Search Report and Written Opinion dated Mar. 22, 2016 for International Application No. PCT/CN2015/081610, 11 pages.
Office Action dated Sep. 30, 2019 for European Patent Application No. 15895201.0, 5 pages.

* cited by examiner

Check Platform Expiration Date

One or more embodiments of determining whether a current date is earlier than an expiration date

COMPUTING APPARATUS AND METHOD WITH PERSISTENT MEMORY

CROSS REFERENCE TO RELATED APPLICATIONS

The present application is a national phase entry under 35 U.S.C. § 371 of International Application No. PCT/CN2015/081610, filed Jun. 17 2015, entitled "PLATFORM MANAGEMENT METHOD AND APPARATUS INCLUDING EXPIRATION DETECTION", which designated, among the various States, the United States of America. The Specifications of the PCT/CN2015/081610 Application is hereby incorporated by reference.

TECHNICAL FIELD

The present disclosure relates to the field of computing. More particularly, the present disclosure relates to a computing platform management method and apparatus that includes expiration detection.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With the rapid growth of deployed computing platforms such as personal computers, servers, tablets, smartphones, and other devices, increasing numbers of these platforms risk becoming out of date. This creates management, operational and security problems ranging from computing platforms no longer working properly with new software to outdated firmware causing security vulnerabilities leaving the platform susceptible to malware or other security attacks.

In some cases, the platform may be brought up to date by updating components of the computing platform, including firmware. In other cases, components may be unable to be updated and the entire platform may need to be discarded and replaced.

BRIEF DESCRIPTION OF THE DRAWINGS

Embodiments of the computer platform expiration detection techniques of the present disclosure may overcome this limitation. The technique will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
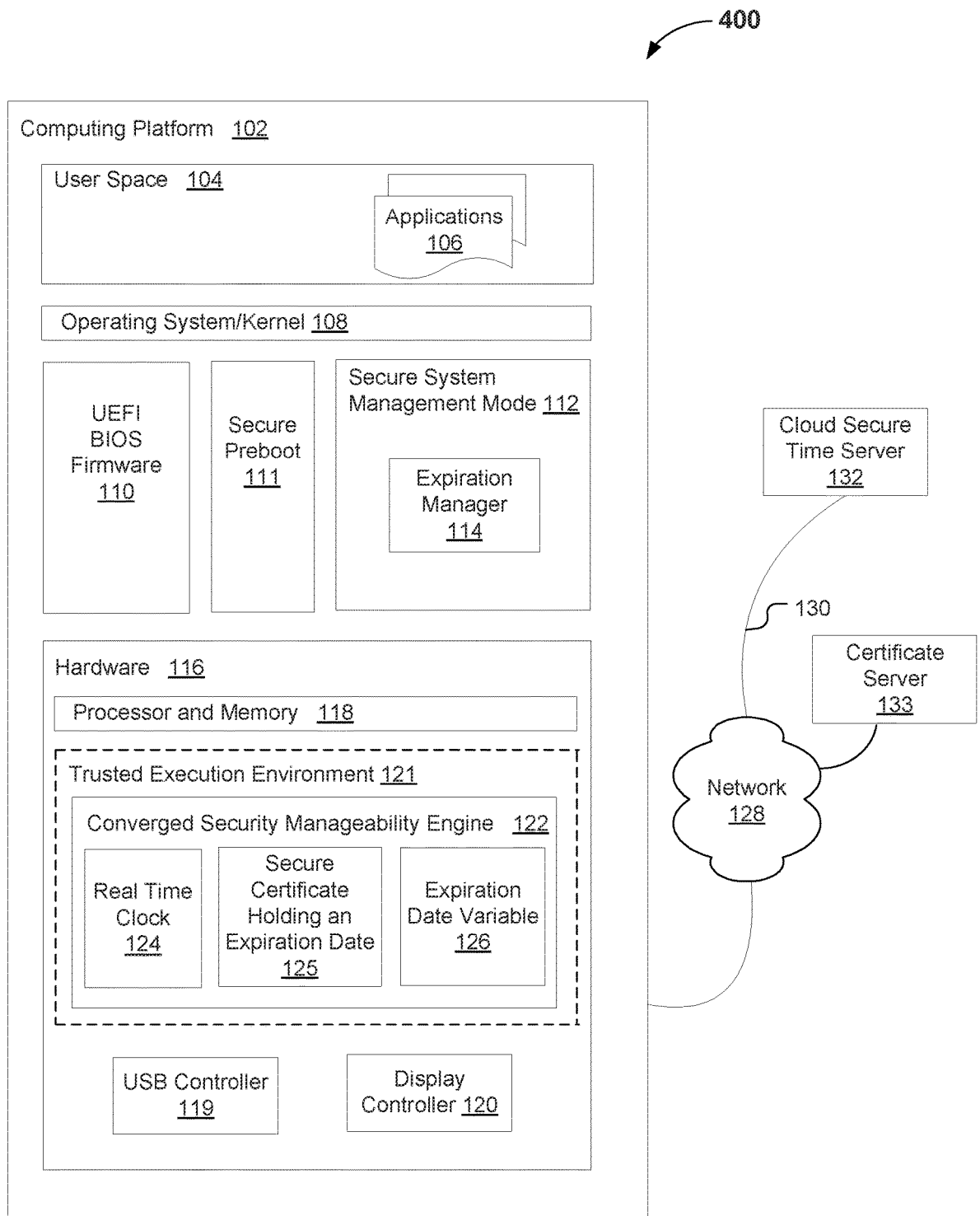
FIG. 1 is a block diagram of a computing platform incorporated with the platform management techniques of the present disclosure, according to various embodiments.

Apparatuses, methods and storage media associated with managing a computing platform is described herein. In embodiments, an apparatus may include a computing platform that includes one or more processors to execute applications; and a trusted execution environment that includes a trusted execution environment that includes a tamper-proof storage to store an expiration date of the computing platform, and a firmware module to be operated in a secure system management mode to regulate operation of the computing platform in view of at least whether a current date is earlier than the expiration date.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Also, as used herein, the term "time" refers to date and time, and the term "date" likewise refers to date and time. Accordingly, the two terms may be considered synonymous, unless the context clearly indicates otherwise.

Referring now to FIG. 1, wherein a block diagram of a computing platform incorporated with the platform management techniques of the present disclosure, according to various embodiments, is shown. As illustrated, diagram 400 may include a computing platform 102 that may include a user space 104 to execute one or more applications 106 that may be assisted by, in embodiments, an operating system/kernel 108 that may be Unified Extensible Firm Interface (UEFI) aware. UEFI BIOS firmware 110 may include support for UEFI secure boot. In embodiments, a secure pre-boot 111 may be included. In embodiments, a secure system management mode 112, which may be referred to as a trust mode, may be included. Secure management mode 112 may include an expiration manager 114 that in embodiments is a firmware module, part of UEFI, that runs in secure system management mode (SMM) context. The expiration manager 114 may communicate with the trusted execution environment 121, described below, using the Host Embedded Controller Interface (HECI). The expiration manager 114 may control the process of determining the expiration date of the computing platform 102, and operations to be taken if the current date is past the expiration date.

In embodiments, hardware 116 may include processor and memory 118, Converged Security Manageability Engine (CSME) 122 storage as well as other hardware devices such as a USB controller 119 and a display controller 120.

The Trusted Execution Environment 121, may include the CSME 122, and provides an isolated tamper-resistant execution environment with secure storage. In embodiments, the Trusted Execution Environment 121 may be isolated from the BIOS, the operating system/kernel 108, and applications 106, preventing these from making any direct changes to its memory contents. In embodiments, this trusted execution environment 121 may be implemented through Software Guard Extensions (SGX) or may be implemented through the UEFI Secure System Management Mode 112.

In embodiments, the CSME 122 storage within the Trusted Execution Environment 121 may contain a microprocessor subsystem inside the chipset that may be used to execute instructions that are not available for execution by the processor and memory 118 or available at the operating system/kernel 108 level.

In embodiments, the CSME 122 may include a real-time clock 124 to securely track the current time in a tamperproof way so that malicious code running, for example, in the user space 104 or the operating system/kernel 108, cannot change the value of the real-time clock 124. In embodiments, if the real-time clock 124 is blank or does not contain a valid time, this may indicate an attempt, for example by malicious software, to attack the computing platform 102 by blanking the CSME 122. In embodiments, the computing platform 102 may retrieve the correct current time by connecting to a cloud secure time server 132 over network 128, and may use a secure tunnel 130. The retrieved current time may be used in the process of detecting the expiration of the computing platform 102, or may be used to update the value of the real-time clock 124, to be described more fully below.

In embodiments, the CSME 122 may also include tamperproof storage of an expiration date 126 that indicates the date after which the computing platform 102 is considered stale. Embodiments of an expiration date 126 may be a single expiration date of the computing platform 102, or may be a selected one of a set of expiration dates of a plurality of updatable components included in computing platform 102. The selection may be in accordance with a policy, e.g., selection of the earliest one among all the expiration dates. The selection may be made when an updatable component is added to computing platform 102. For example, computing platform 102 may include updatable firmware elements F1, F2, . . . FN having corresponding expiration dates. The expiration date 126 may be the earlier expiration date or the minimum of the expiration dates of the firmware elements F1, F2, . . . FN. Examples of updatable firmware components may include, but are not limited to: BIOS firmware; BIOS extensions, for example option ROM's; embedded controller firmware; Power Management Integrated Circuits (PMIC) power control units, keyboard controllers, hard disk controllers, networking devices, and the like.

A stale computing platform 102 may be required, for example, to become inoperable, be required to have firmware upgraded, or have the user notified. Accordingly, under the present disclosure, a computing platform 102 may be managed in part through detection of expiration date. In embodiments, the CSME 122 may include a location that contains an expiration date variable 124 which may be stored, for example, as raw data and/or protected by a UEFI Authenticated Variable. In other embodiments, the CSME 122 may include a secure certificate holding an expiration date 125. The certificate may be received from an external source, verified by an Online Certificate Status Protocol (OCSP) and be revoked or replaced by a new certificate. In embodiments, the computing platform 102 may receive a secure certificate holding an expiration date 125 from a certificate server 133 over network 128.

The computing platform 102, except for the teaching of the present disclosure, may be any one of a number of computing devices known in the art, e.g., a wearable device, a smartphone, a computing tablet, a notebook computer, a laptop computer, a desktop computer, a server, a set-top box, a game console, a camera, and so forth.

Figure 2:
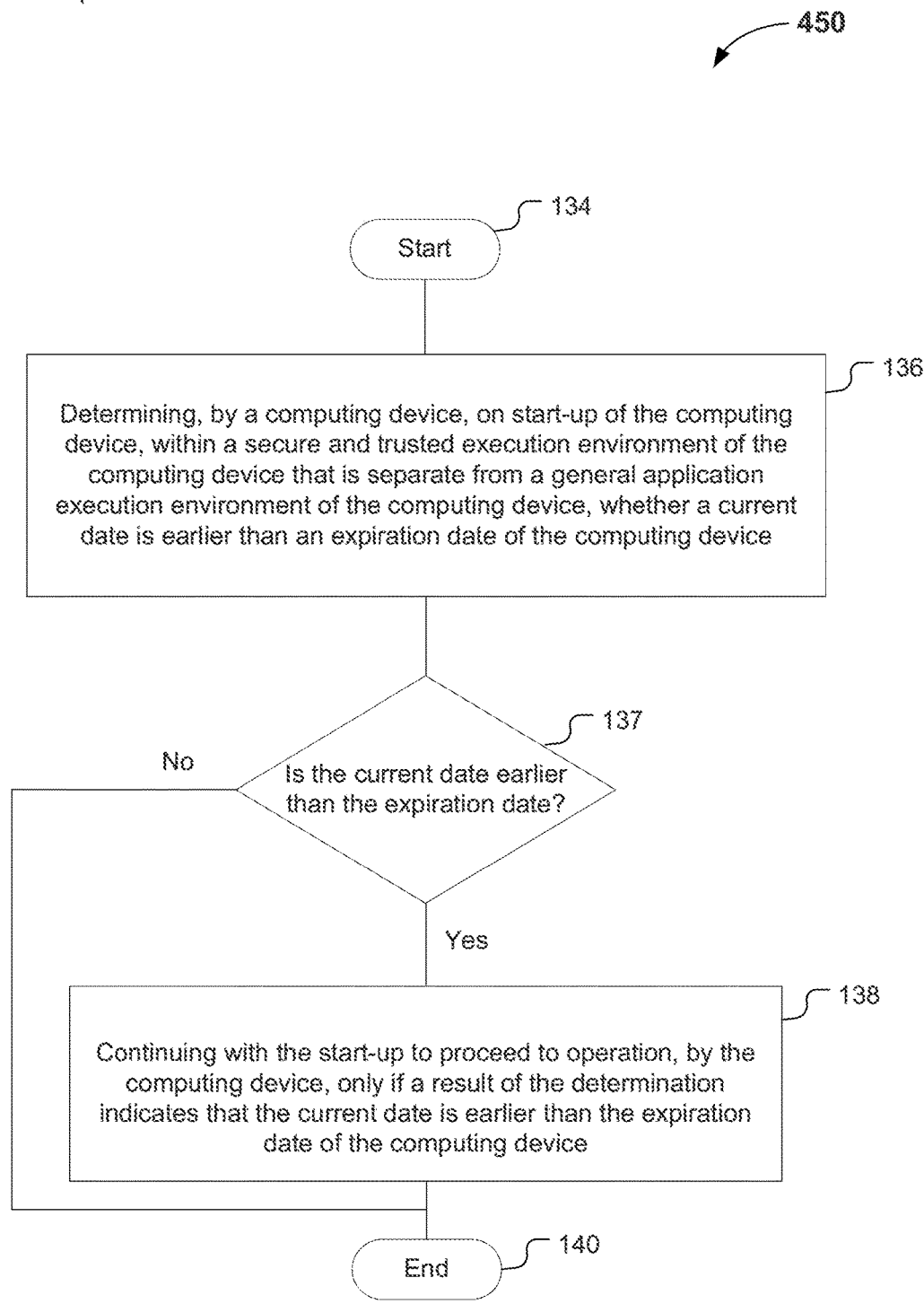
FIG. 2 is a flow diagram illustrating a method for checking a platform expiration date, according to various embodiments.

Referring now to FIG. 2, wherein a flow diagram showing a method 450 for checking a platform expiration date, according to various embodiments, is illustrated. The method 450 may be performed by earlier described expiration manager 114. As shown, the method 450 may start at block 134.

At block 136, a determination may be made, by a computing device, on start-up of the computing device, within a secure and trusted execution environment of the computing device that is separate from a general application execution environment of the computing device, whether a current date is earlier than an expiration date of the computing device.

In embodiments, the computing device may be a computing platform 102 that includes, upon start up, one or more pre-boot tools, or a secure pre-boot 111 area able to interact with the secure and trusted execution environment, for example the trusted execution environment 121, to determine if the current date is earlier than an expiration date. Some embodiments of block 136 will be further described with references to FIG. 3.

At block 137, if a result of the determination at block 136 indicates the current date is earlier than an expiration date, method 450 may proceed to block 138. If a result of the determination at block 136 indicates the current date is later than or equal to the expiration date, method 450 may proceed to block 140, where method 450 may end. In other words, the start-up process is terminated/aborted.

At block 138, the computing device may continue with the start-up to proceed to operation. In embodiments, the operation in this block may implement the policies of the system administrator, a system manager, a user, or some other individual or group that is responsible for enforcing rules regarding the function and the security of the computing platform 102. Some embodiments of block 138 will be further described with references in FIG. 4. Thereafter, method 450 may end.

Different embodiments may implement different security policies or performance policies of system managers when handling an expired computing platform 102. In embodiments, an expiration date may be set during manufacture of the computing platform 102 or one or more components thereof. This information may be used, in non-limiting examples, by Department of Defense, system-on-a-chip (SoC) providers, original equipment manufacturers (OEMs), service providers, data centers and users to plan for support, maintenance and migration to newer hardware and software environments. In another non-limiting example, the expiration date of a computer platform 102 may be used to determine if the platform is not going to be updated so system managers can make procurement or network access control decisions. In another non-limiting example, a system manager may use the expiration date as an indicator for how long the hardware or software stack on a computing platform 102 will provide the desired user experience before having to update or re-purchase another platform.

In other embodiments, the discovery of a critical security issue may require that an expiration date be set to a more recent value for the critical security issue to be addressed before the platform is allowed to operate. In other embodiments, a customer or user may be able to take some action, in non-limiting examples to update firmware or to sign up for a service plan for the platform to operate past its expiration date.

In one non-limiting example, a computing platform 102 running in a secure, classified government operational environment may never be operable after an expiration date. In another non-limiting example, a computing platform 102 running in a mission-critical operational environment may not be operable after a determined expiration date, unless the platform is updated and receives an updated expiration date. In another non-limiting example, a user of gaming applications may wish to be notified if the computing platform 102 is passed an expiration date so the user has the option to update the platform, but be given the option to continue to use the platform without an update. In another non-limiting example, a user using a computing platform 102 only for web browsing may not be concerned about the expiration date of the platform, and choose to disable the expiration check altogether.

Figure 3:
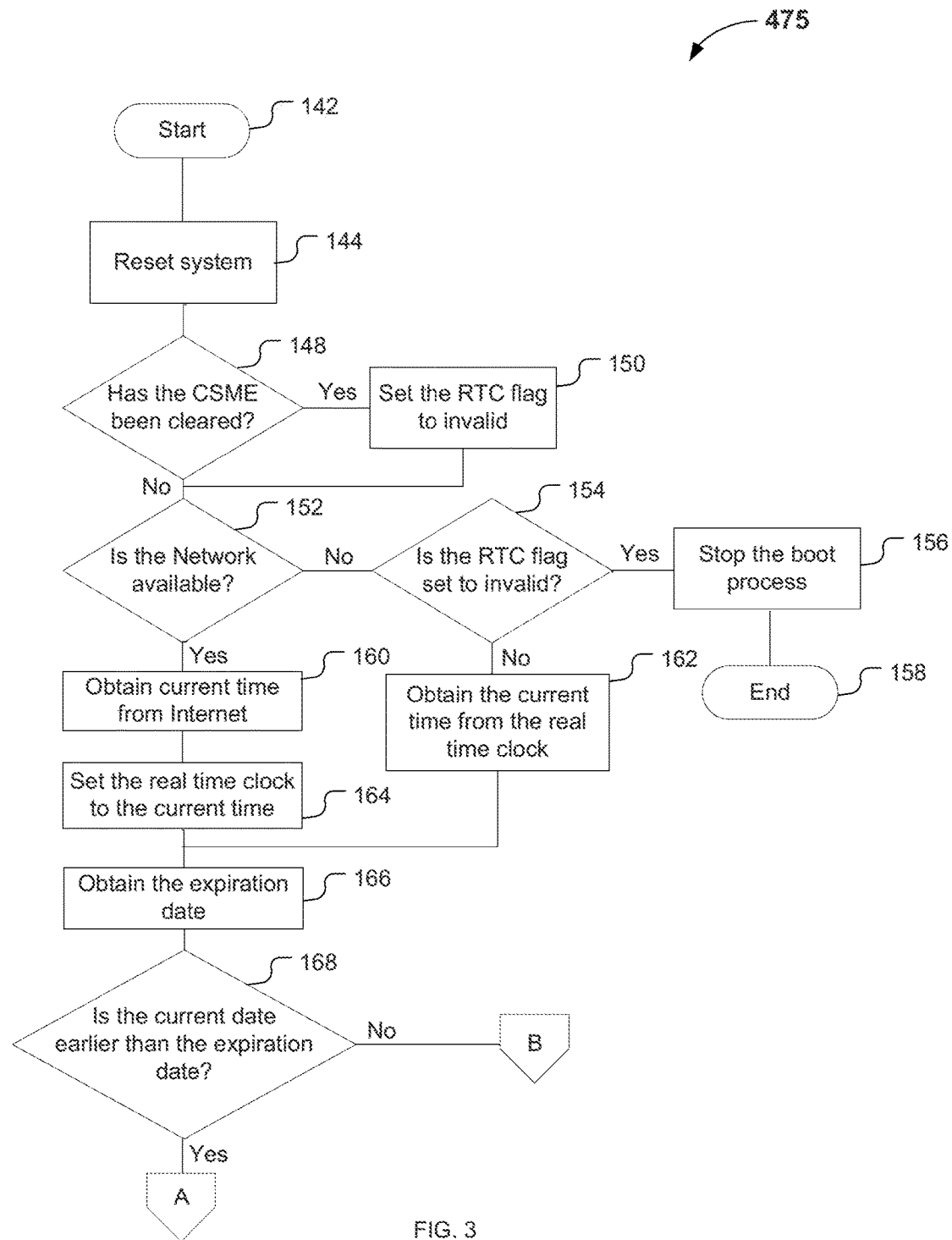
FIG. 3 is a flow diagram illustrating a method for determining whether a current date is earlier than an expiration date, according to various embodiments.

Referring now to FIG. 3, wherein a flow diagram showing a method 475 for determining whether a current date is earlier than an expiration date, according to various embodiments, is illustrated. Method 475 may be example embodiments of block 136 shown in FIG. 2. The method 475 may be performed by earlier described expiration manager 114. The method 475 may start at block 142.

At block 144, a computing system may be reset. This may include a power on, system restart, or other reset operation that may cause the computing platform 102 to perform embodiments of expiration detection. In embodiments, the computing platform 102 may perform an expiration date check early in the boot process. For example, the computing platform 102 may run the expiration manager 114 in a ROM or operating system boot loader, which may run before any third-party component runs. In embodiments, this may be done in the firmware phase, for example within UEFI BIOS firmware that may have a secure system management mode 112. In other embodiments, the expiration manager 114 may be located within the trusted execution environment 121, or in other secure areas within the computing platform 102.

At block 148, a check may be performed to determine if the CSME 122 has been cleared. In embodiments, this may indicate an attempt to compromise the computing platform 102 by tampering with or erasing the value of the real-time clock 124 has been made. If a result of the determination shows that the CSME 122 has been cleared, then at block 150, the real-time clock flag may be set to invalid.

At block 152, a determination may be made on whether the network is available. In embodiments the network may include an intranet, an extranet, or access to the Internet that may be used to obtain, for example, the current time or access to a certificate server to receive a secure certificate holding an expiration date 125. If the network is not available, then at block 154 a determination may be made on whether a real-time clock flag is set to invalid. In embodiments, this may indicate a malware attack has occurred on the computing platform 102. If the real-time clock flag is set to invalid, then at block 156 the boot process may be stopped, and the method may end at block 158. If at block 154 the real-time clock flag is not set to invalid, then at block 162 the current time may be obtained from the real-time clock 124. In embodiments, the real-time clock 124 may operate within the trusted execution environment 121. Thereafter, the method 475 may proceed to block 166.

If at block 152, the network is available, then at block 160 the current time may be obtained from the Internet. In embodiments, the computing platform may connect to a cloud secure time server 132 over network 128 and may use a secure tunnel 130 to ensure that the correct current time is received. At block 164, the real-time clock 124 may be set to the current time.

At block 166, the expiration date may be obtained. In embodiments, the expiration date 126 may be stored in a trusted execution environment 121 location as raw data, stored within a variable, or protected by a UEFI authenticated variable. In other embodiments, the expiration date may be held in a secure certificate holding an expiration date 125. The secure certificate may be verified by an OSCP process, which may result in the revocation and replacement of the certificate by a validated new certificate with an updated expiration date.

Figure 4:
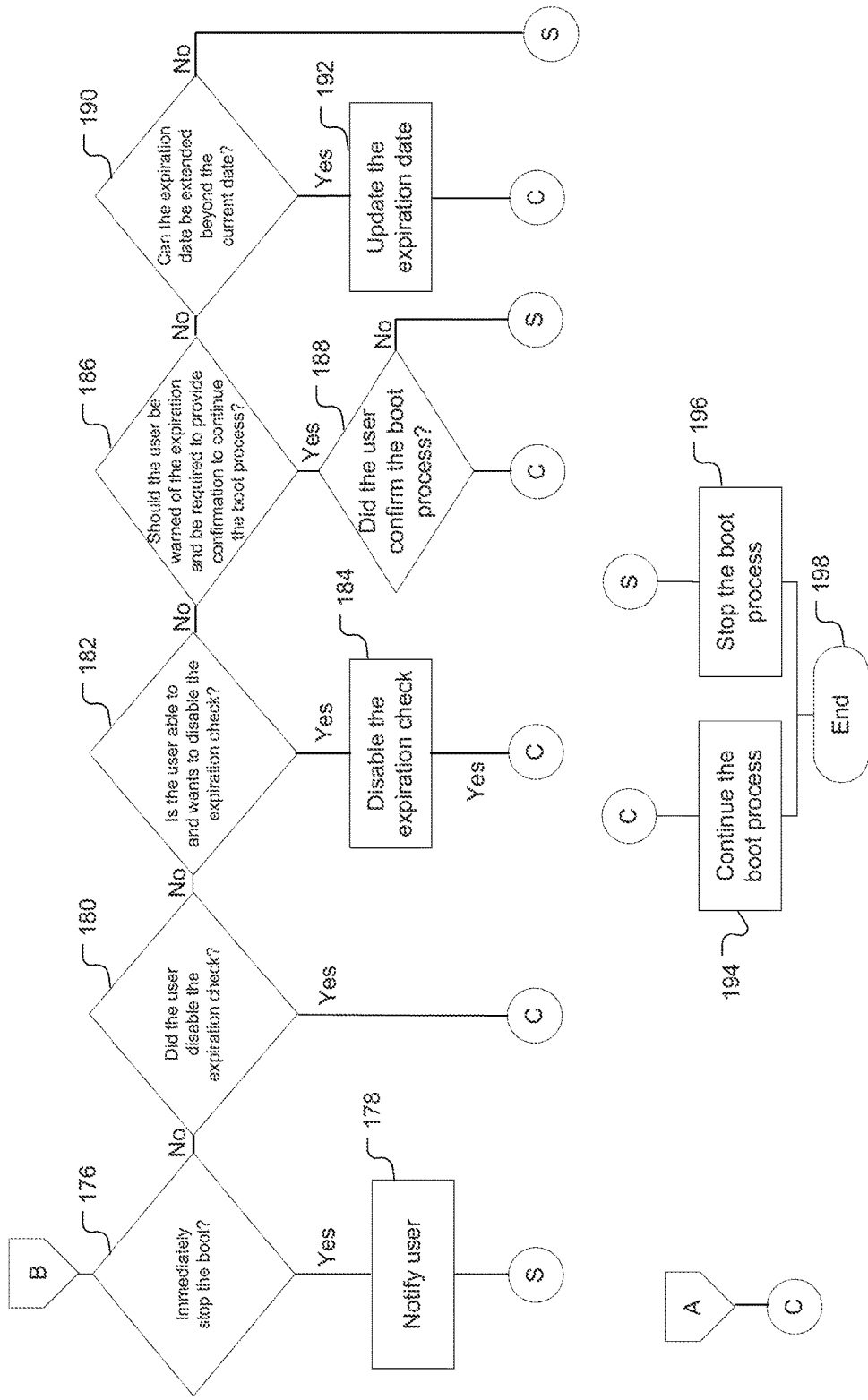
FIG. 4 is a flow diagram illustrating a method for continuing with the startup to proceed to operation only if the current date is earlier than the expiration date, according to various embodiments.

At block 168, if a result of the determination indicates that the current date is earlier than the expiration date, the method 475 may proceed to block 194 shown on FIG. 4. At block 194, the method 475 may continue with the boot process, and eventually, the method 475 may end at block 198. Otherwise, if a result of the determination indicates that the current date is not earlier than the expiration date, then the method may proceed to block 176 shown on FIG. 4.

Referring now to FIG. 4, wherein a flow diagram showing a method 485 for continuing with the startup to proceed to operation, according to various embodiments, is illustrated. Method 485 may be example embodiments of operation 138 shown on FIG. 2.

At block 176, a determination may be made if the boot process should be immediately stopped. In embodiments, a boot process may be immediately stopped, for example, if security or system management policies call for no computing platform 102 to be operable once it is beyond its expiration date. At block 178, a user may be notified instead. In embodiments, notification may be given on a display connected to the computing platform 102 that the platform is expired. At block 196, the boot process may be stopped. Thereafter, the method 485 may end at block 198.

At block 180, a determination may be made on whether the user disabled the expiration check. In embodiments, a system manager or a user may have policies that allow the user to disable the expiration check on the computing platform 102. In one non-limiting example, the platform may be a single computer that is used by only one person only for web browsing. If the user disabled the expiration check, then the regulation operation of the computing platform 102 may be disabled, and at block 194 the boot process may continue. Thereafter, the method 485 may end at block 198.

At block 182, a determination may be made on whether the user is able, and wants to disable the expiration check. In embodiments, disabling the expiration check may disable the regulation operation of the computing platform 102. If the user is able, and wants to disable the expiration check, then at block 184 the method may disable the expiration check. At block 194, the method may continue with the boot process. At block 198, the method 485 may end.

At block 186, a determination may be made on whether the user should be warned of the expiration and be required to provide confirmation to continue the boot process. In embodiments, the user may be prompted with displays on a display device, and an indication of a confirmation from an input device may be received. If so, then at block 188 a determination may be made on whether the user confirmed the boot process. If so, then at block 194 the boot process may continue. If not, then at block 196 the boot process may stop. Thereafter, the method 485 may end at block 198.

At block 190 a determination may be made on whether the expiration date can be extended beyond the current date. In embodiments, a check may be performed, for example, by sending a query over the network 128 and receiving a response. The response may indicate whether updates for the computing platform 102 such as firmware or software updates may be available that, when applied, may cause the expiration date to be extended. If so, the updates may be received and, applied to the computing platform. In embodiments, the purchase of a support subscription, a service, and/or a product from a vendor, may allow the expiration date to be extended.

If the expiration date may be extended, then at block 192 the expiration date may be updated (that is, extended). In embodiments, the expiration date may be updated by updating the expiration date variable 126, or by updating the secure certificate holding an expiration date 125, as further described with references to FIG. 5.

Then, at block 194 the boot process may continue. If not, method 485 may proceed to block 196. At block 196 the boot process may be stopped. Thereafter, the method 485 may end at block 198.

Figure 5:
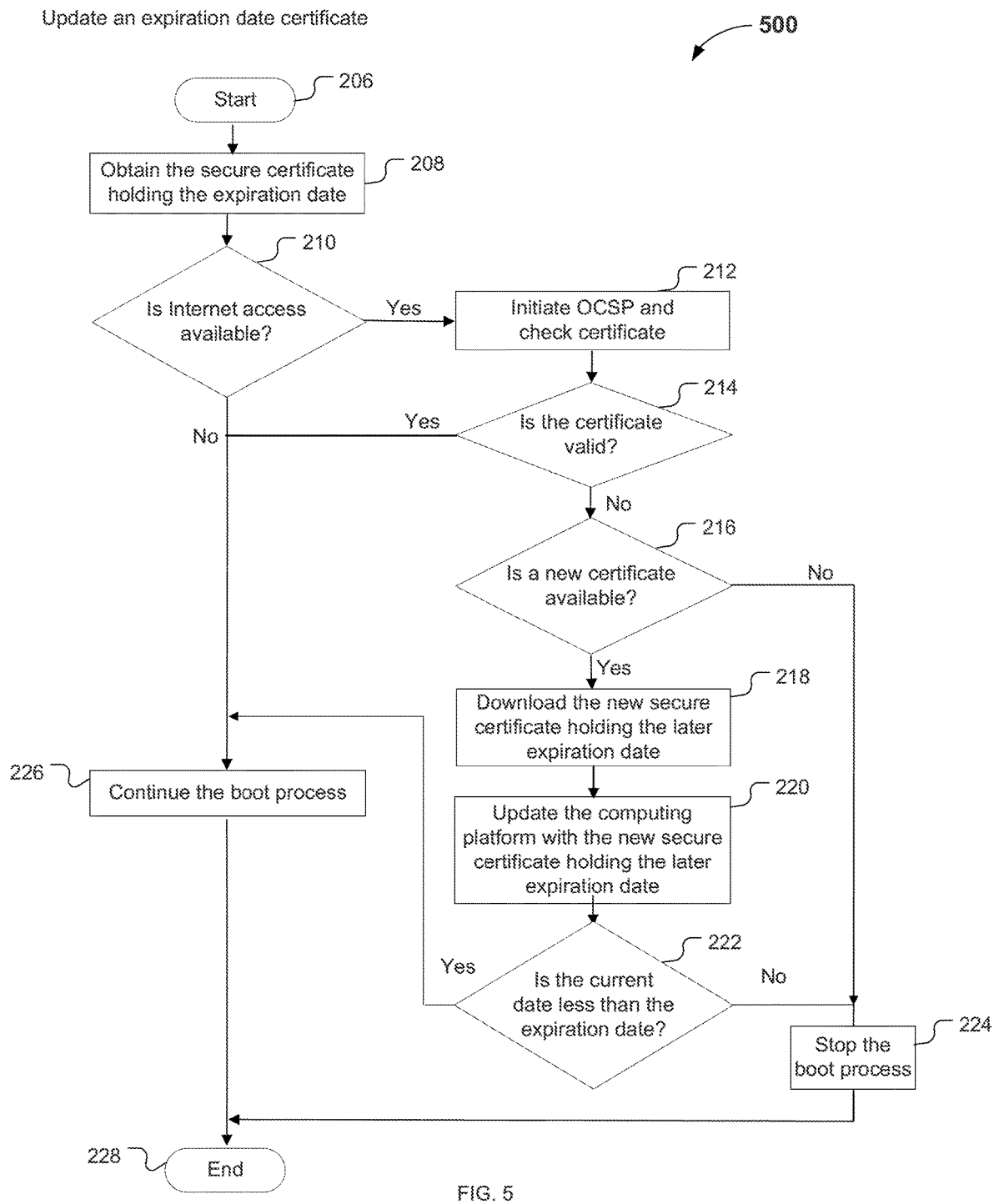
FIG. 5 is a flow diagram illustrating an operational flow for updating an expiration date certificate, according to various embodiments.

Referring now to FIG. 5, wherein a flow diagram 500 showing a method for updating an expiration date certificate, according to various embodiments, is illustrated. The method 500 may be performed by the earlier described expiration manager 114. The method 500 may represent some embodiments of block 166 shown in FIG. 3 and block 192 shown in FIG. 4.

The method may start at 206.

At block 208, the secure certificate holding the expiration date may be obtained. In embodiments, the certificate may be stored within the trusted execution environment 121 area of the computing platform 102.

At block 210, a determination may be made on whether Internet access is available to the computing platform. If not, then at block 226 the boot process may continue. Thereafter, the method 500 may end at block 228.

If Internet access is available, then at block 212, the Online Certificate Status Protocol (OCSP) may be initiated to verify the validity of the stored secure certificate 125.

At block 214, a determination may be made on whether the certificate is valid. If it is valid, then at block 226 the boot process may continue. Thereafter, the method may end at block 228.

If the certificate is not valid, then at block 216 a determination may be made on whether a new certificate is available. In embodiments, an indication may be received from a certificate server 133 indicating that a new certificate is available. In embodiments, this may include an analysis of the computing platform 102 and/or its components to determine if a new certificate is available to be issued with a later expiration date. If a new certificate with a later expiration date is not available, then at block 224 the boot process may be stopped. Thereafter, the method may end at block 228.

If a new certificate with a later expiration date is available, then at block 218 the new secure certificate holding the later expiration date may be downloaded. In embodiments, the new certificate with the later expiration date may be received from the certificate server 133.

At block 220, the computing platform may be updated with the new secure certificate holding the later expiration date. In embodiments, the new certificate with the later expiration date may be stored in the trusted execution environment 121.

At block 222, a determination may be made on whether the current date is less than the new expiration date. If it is not, at block 224 the boot process may be stopped. Thereafter, the method may end at block 228.

Otherwise, if the current date is less than the new expiration date, then at block 226, the boot process may continue.

Thereafter, the method may end at block 228.

Thus, methods and apparatuses associated with platform management that includes the usage of an expiration date have been described. While for ease of understanding, methods and apparatuses have thus far described with embodiments, having a single expiration date or a selected one among a plurality of expiration dates stored in the secure storage, the present disclosure is not limited. In alternate embodiments, multiple expiration dates may be stored in the secure storage, and processes 450 and 475, in particular, operations at blocks 137 and 168 may be modified to perform the expiration determination against a set of expiration dates, as opposed to a (pre-determined) single expiration date.

Figure 6:
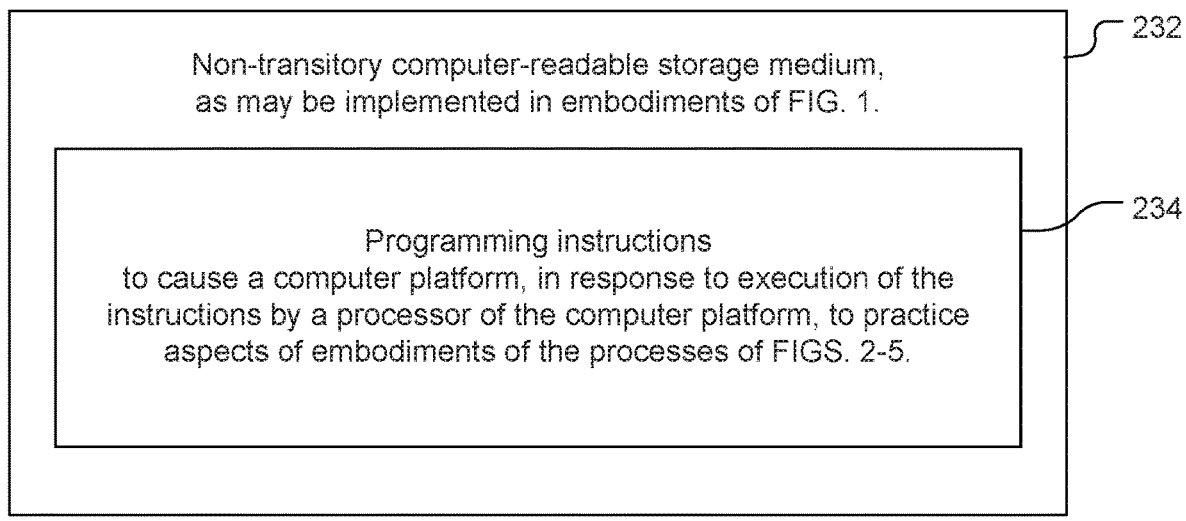
FIG. 6 illustrates a storage medium having instructions for practicing methods described with references to FIGS. 2-5, according to various embodiments.

FIG. 6 illustrates a storage medium having instructions for practicing methods described with references to FIG. 2-5, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 232 may include a number of programming instructions 234. Programming instructions 234 may be configured to enable a device, e.g., computing platform 102, in response to execution of the programming instructions, to perform operations associated with operating system/kernel 108, applications 106, UEFI BIOS firmware 110, secure preboot 111, secure system management mode 112, expiration manager 114, trusted execution environment 121, converged security manageability engine 122, and/or real time clock 124. In alternate embodiments, programming instructions 234 may be disposed on multiple computer-readable non-transitory storage media 232 instead. In alternate embodiments, programming instructions 234 may be disposed on computer-readable transitory storage media 232, such as signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may be an apparatus for computing, comprising: a computing platform that includes one or more processors to execute applications, and a trusted execution environment that includes: a tamper-proof storage to store an expiration date of the computing platform, and a firmware module to be operated in a secure system management mode to regulate operation of the computing platform in view of at least whether a current date is earlier than the expiration date.

Example 2 may be example 1, wherein the expiration date may be the earlier of the expiration date of multiple components having expiration dates that are included in the computing platform, the multiple components including firmware components.

Example 3 may be example 1, wherein the firmware module may permit operation of the computing platform if the current date is earlier than the expiration date.

Example 4 may be example 1, wherein as part of regulation of the operation of the computing platform, the firmware module may send to a user a query, in response to the current date not earlier than the expiration date, to ask whether the user wishes to permit operation of the computing platform. The firmware module may receive from the user a response to the query and may permit operation of the computing platform only if the received response indicates that the user wishes to permit operation of the computing platform.

Example 5 may be example 1, wherein as part of regulation of the operation of the computing platform, the firmware module may search for a firmware update for the computing platform, in response to the current date not earlier than the expiration date, wherein the firmware update is to cause the expiration date of the computing platform to be later than the current date. The firmware module may receive the firmware update, may apply the firmware update, and may permit operation of the computing platform.

Example 6 may be example 5, wherein on application on application of the firmware update, the firmware module may further: update the expiration date of the computing platform.

Example 7 may be example 1, wherein as part of regulation of the operation of the computing platform, the firmware module may: receive from a user a request to disable the regulation operation of the computing platform, may disable the regulation operation of the computing platform, in response to the disable request, and may permit operation of the computing platform.

Example 8 may be example 1, wherein the firmware module may receive the expiration date of the computing platform from: a trusted certificate stored in the trusted execution environment, or an authenticated variable stored in an unified extensible firmware interface (UEFI) of a basic input/output system (BIOS) of the apparatus.

Example 9 may be example 1, wherein as part of regulation of the operation of the computing platform, the firmware module may determine the expiration date of the computing platform from the tamper-proof storage, may receive the current date; and may compare the determined expiration date of the computing platform and the received current date.

Example 10 may be any one of examples 1-9, wherein the firmware module may receive the current date from a secure real-time clock in the trusted execution environment or a cloud secure time server.

Example 11 may be a method for computing, comprising: determining, by a computing device, on start-up of the computing device, within a secure and trusted execution environment of the computing device that is separate from a general application execution environment of the computing device, whether a current date is earlier than an expiration date of the computing device, and continuing with the start-up to proceed to operation, by the computing device, only if a result of the determination indicates that the current date is earlier than the expiration date of the computing device.

Example 12 may be example 11, wherein determining whether a current date is earlier than an expiration date of the computing device fluffier comprises determining whether the current date is earlier than the expiration date of any components having expiration dates that are included in the computing platform, the multiple components including firmware components.

Example 13 may be example 11, wherein determining whether a current date is earlier than an expiration date of the computing device may further comprise: determining the expiration date of the computing device; receiving the current date from a current date source; and comparing the determined expiration date of the computing device and the received current date.

Example 14 may be example 13, wherein receiving the current date may comprise receiving the current date from a current date source that is a selected one of: a secure real-time clock in the trusted execution environment or a cloud secure time server.

Example 15 may be example 11, wherein continuing with the start-up to proceed to operation, by the computing device, only if a result of the determination indicates that the current date is earlier than the expiration date of the computing device further comprises: sending to a user a query of whether the user wishes to permit operation of the computing device, receiving from the user a response to the query; and continuing to proceed to operation of the computing device only if the received response indicates that the user wishes to permit operation of the computing device.

Example 16 may be any one of examples 11-15, wherein continuing with the start-up to proceed to operation, by the computing device, only if a result of the determination indicates that the current date is earlier than the expiration date of the computing device may further comprise: searching for a firmware update for the computing device, the update causing the expiration date of the computing device to be later than the current date, receiving the firmware update, applying the firmware update, and continuing to proceed to operation of the computing device.

Example 17 may be example 16, wherein continuing with the start-up to proceed to operation, by the computing device, only if a result of the determination indicates that the current date is earlier than the expiration date of the computing device further comprises updating the expiration date of the computing device.

Example 18 may be one or more computer-readable media comprising instructions that cause a computing device, in response to execution of the instructions by the computing device, to: determine on start-up of the computing device, within a secure and trusted execution environment of the computing device that is separate from a general application execution environment of the computing device, whether a current date is earlier than an expiration date of the computing device; and continue with the start-up to proceed to operation only if a result of the determination indicates that the current date is earlier than the expiration date of the computing device.

Example 19 may be example 18 wherein determine whether a current date is earlier than an expiration date of the computing device may further comprise determine whether the current date is earlier than the expiration date of any components having expiration dates that are included in the computing platform, the multiple components including firmware components.

Example 20 may be example 18 wherein determine whether a current date is earlier than an expiration date of the computing device may further comprise: determine the expiration date of the computing device. receive the current date from a current date source, and compare the determined expiration date of the computing device and the received current date.

Example 21 may be example 20, wherein receive the current date comprises receive the current date from a current date source that is a selected one of: a secure real-time clock in the trusted execution environment or a cloud secure time server.

Example 22 may be example 18, wherein continue with the start-up to proceed to operation only if a result of the determination indicates that the current date is earlier than the expiration date of the computing device may further comprise: send to a user a query of whether the user wishes to permit operation of the computing device, receive from the user a response to the query; and continue to proceed to operation of the computing device only if the received response indicates that the user wishes to permit operation of the computing device.

Example 23 may be any one of examples 18-22, wherein continue with the start-up to proceed to operation only if a result of the determination indicates that the current date is earlier than the expiration date of the computing device may further comprise: search for a firmware update for the computing device, the update causing the expiration date of the computing device to be later than the current date; receive the firmware update; apply the firmware update; and continue to proceed to operation of the computing device.

Example 24 may be example 23, wherein continue with the start-up to proceed to operation, by the computing device, only if a result of the determination indicates that the current date is earlier than the expiration date of the computing device further comprises update the expiration date of the computing device.

Example 25 may be a computing device, comprising: means for determining, on start-up of a computing device, within a secure and trusted execution environment of the computing device that is separate from a general application execution environment of the computing device, whether a current date is earlier than an expiration date of the computing device; and means for continuing with the start-up to proceed to operation, by the computing device, only if a result of the determination indicates that the current date is earlier than the expiration date of the computing device.

Example 26 may be example 25, wherein means for determining whether a current date is earlier than an expiration date of the computing device comprises means determining whether the current date is earlier than the expiration date of any components having expiration dates that are included in the computing platform, the multiple components including firmware components.

Example 27 may be example 25, wherein means for determining whether a current date is earlier than an expiration date of the computing device comprises means for determining the expiration date of the computing device, means for receiving the current date from a current date source, and means for comparing the determined expiration date of the computing device and the received current date.

Example 28 may be example 25, wherein means for continuing with the start-up to proceed to operation only if a result of the determination indicates that the current date is earlier than the expiration date of the computing device comprises means for sending to a user a query of whether the user wishes to permit operation of the computing device, means for receiving from the user a response to the query, and means for continuing to proceed to operation of the computing device only if the received response indicates that the user wishes to permit operation of the computing device.

Example 29 may be any one of examples 25-28, wherein means for continuing with the start-up to proceed to operation only if a result of the determination indicates that the current date is earlier than the expiration date of the computing device comprises means for searching for a firmware update for the computing device, the update causing the expiration date of the computing device to be later than the current date, means for receiving the firmware update, means for applying the firmware update, and means for continuing to proceed to operation of the computing device.

Example 30 may be example 29, wherein means for continuing with the start-up to proceed to operation only if a result of the determination indicates that the current date is earlier than the expiration date of the computing device further comprises means for updating the expiration date of the computing device.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
   a computing platform that includes one or more processors to execute applications;
   a trusted execution environment (TEE) that includes a tamper-proof storage to store an expiration date of the computing platform; and
   a set of Unified Extensible Firmware Interface (UEFI) firmware modules to provide a plurality of basic input/output system (BIOS) services for the computing platform, that includes booting of the computing platform at power on or reset, and cooperation with the TEE to facilitate protected access to the expiration date as an authenticated variable, wherein the UEFI further includes an expiration manager to be operated in a secure system management mode, while the computing platform is being booted, to examine the UEFI authenticated variable to determine whether a current date is earlier than the expiration date, to enable the UEFI firmware to regulate booting of the computing platform based at least in part on whether the current date is earlier than the expiration date.

2. The apparatus of claim 1, wherein the tamper-proof storage stores a plurality of expiration dates of multiple components of the computing platform, and the expiration date to which the current date is compared is the earliest of the expiration date of multiple components.

3. The apparatus of claim 1, wherein the UEFI firmware modules are to permit operation of the computing platform if the current date is earlier than the expiration date.

4. The apparatus of claim 1, wherein as part of regulation of the booting of the computing platform, the UEFI firmware modules are to:
send to a user a query, in response to the current date not earlier than the expiration date, to ask whether the user wishes to permit booting of the computing platform;
receive from the user a response to the query; and
permit booting of the computing platform only if the received response indicates that the user wishes to permit booting of the computing platform.

5. The apparatus of claim 1, wherein as part of regulation of the booting of the computing platform, the UEFI firmware modules are to:
search for a firmware update for the computing platform, in response to the current date not earlier than the expiration date, wherein the firmware update is to cause the expiration date of the computing platform to be later than the current date;
receive the firmware update;
apply the firmware update; and
permit booting of the computing platform.

6. The apparatus of claim 5, wherein on application of the firmware update, the UEFI firmware modules are to further:
update the expiration date of the computing platform.

7. The apparatus of claim 1, wherein as part of regulation of the booting of the computing platform, the UEFI firmware modules are to:
receive from a user a request to disable the regulation of booting of the computing platform;
disable the regulation of booting of the computing platform, in response to the disable request; and
permit booting of the computing platform.

8. The apparatus of claim 1, wherein as part of regulation of the booting of the computing platform, the UEFI firmware modules are to:
determine the expiration date of the computing platform from the tamper-proof storage;
receive the current date; and
compare the determined expiration date of the computing platform and the received current date.

9. The apparatus of claim 1, wherein the UEFI firmware modules are to receive the current date from a secure real-time clock in the trusted execution environment or a cloud secure time server.

10. The apparatus of claim 1, wherein the expiration date is stored at manufacture time of the apparatus.

11. A method for computing, comprising:
booting a computing device, with a set of Unified Extensible Firmware Interface (UEFI) firmware modules of the computing device, on reset or start-up of the computing device, including determining whether a current date is earlier than an expiration date of the computing device, wherein the expiration date is stored in a secure storage location within a trusted execution environment of the computing device that is separate from a general application execution environment of the computing device, and the UEFI modules access the expiration date in the trusted execution environment (TEE) as an UEFI authenticated variable; and
continuing with the booting, by the computing device, only if a result of the determination indicates that the current date is earlier than the expiration date of the computing device.

12. The method of claim 11, wherein determining whether a current date is earlier than an expiration date of the computing device further comprises selecting an earliest expiration date of any components having expiration dates that are included in a computing platform as the expiration date to be compared to the current date.

13. The method of claim 11, wherein determining whether a current date is earlier than an expiration date of the computing device further comprises:
determining the expiration date of the computing device;
receiving the current date from a current date source that is a selected one of: a secure real-time clock in the trusted execution environment or a cloud secure time server; and
comparing the determined expiration date of the computing device and the received current date.

14. The method of claim 11, further comprising, upon a result of the determination indicating that the current date is not earlier than the expiration date of the computing device:
sending to a user a query of whether the user wishes to permit operation of the computing device;
receiving from the user a response to the query; and
continuing to proceed to operation of the computing device only if the received response indicates that the user wishes to permit booting of the computing device.

15. The method of claim 11, further comprising, upon a result of the determination indicating that the current date is not earlier than the expiration date of the computing device:
searching for a firmware update for the computing device, the update causing the expiration date of the computing device to be later than the current date;
receiving the firmware update;
applying the firmware update;
updating the expiration date of the computing device; and
continuing to proceed to booting of the computing device.

16. One or more non-transitory computer-readable media comprising instructions that cause a computing device, in response to execution of the instructions by the computing device, to implement a set of Unified Extensible Firmware Interface (UEFI) firmware modules to:
boot the computing device, on start-up of the computing device, that includes to determine whether a current date is earlier than an expiration date of the computing device, wherein the expiration date is stored in a secure storage location within a trusted execution environment of the computing device that is separate from a general application execution environment of the computing device, and the UEFI modules access the expiration date in the trusted execution environment (TEE) as an UEFI authenticated variable; and continue to boot only if a result of the determination indicates that the current date is earlier than the expiration date of the computing device.

17. The one or more non-transitory computer-readable media of claim 16, wherein to determine whether a current date is earlier than an expiration date of the computing device comprises to determine whether the current date is earlier than an earliest expiration date of any components having expiration dates that are included in the secure storage location.

18. The one or more non-transitory computer-readable media of claim 16, wherein to determine whether a current date is earlier than an expiration date of the computing device comprises to:
   determine the expiration date of the computing device;
   receive the current date from a current date source that is a selected one of: a secure real-time clock in the trusted execution environment or a cloud secure time server; and
   compare the determined expiration date of the computing device and the received current date.

19. The one or more non-transitory computer-readable media of claim 16, wherein the computing device is further caused, upon a result of the determination indicating that the current date is not earlier than the expiration date of the computing device, to:
   send to a user a query of whether the user wishes to permit operation of the computing device;
   receive from the user a response to the query; and
   continue to proceed to operation of the computing device only if the received response indicates that the user wishes to permit booting of the computing device.

20. The one or more non-transitory computer-readable media of claim 16, wherein the computing device is further caused, upon a result of the determination indicating that the current date is not earlier than the expiration date of the computing device, to:
   search for a firmware update for the computing device, the update causing the expiration date of the computing device to be later than the current date;
   receive the firmware update;
   apply the firmware update;
   update the expiration date of the computing device; and
   continue to proceed to booting of the computing device.

* * * * *